Figure 1:
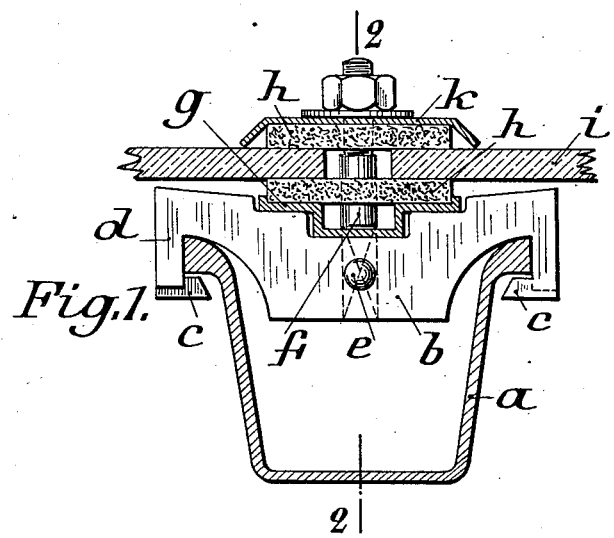

A. WENDLER.
GLASS ROOF.
APPLICATION FILED DEC. 1, 1911.

1,016,118.

Patented Jan. 30, 1912.

WITNESSES
E. C. Schuermann

INVENTOR
Adolph Wendler

UNITED STATES PATENT OFFICE.

ADOLPH WENDLER, OF LICHTENBERG, NEAR BERLIN, GERMANY, ASSIGNOR TO THE FIRM OF D. HIRSCH, OF LICHTENBERG, NEAR BERLIN, GERMANY.

GLASS ROOF.

1,016,118.  Specification of Letters Patent.  Patented Jan. 30, 1912.

Application filed December 1, 1911. Serial No. 663,357.

*To all whom it may concern:*

Be it known that I, ADOLPH WENDLER, a subject of the German Emperor, residing at 140 Herzbergstrasse, Lichtenberg, near Berlin, Germany, have invented certain new and useful Improvements in Glass Roofs; and I do hereby declare the following to be a full, clear, and exact description of the invention, such as will enable others skilled in the art to which it appertains to make and use the same.

The invention relates to roof structures, and more particularly to means for supporting and securing the glass coverings of skylights, roofs and the like, in such manner as to render the roof water-tight, and prevent the fastening devices working loose under the action of wind pressure and changing temperature.

It has been common practice heretofore to support the glass coverings or skylights and roofs upon U-shaped bars or beams, by means of clamping bridges disposed between or otherwise connected to the vertical members of the U-shaped bars, and held in engagement therewith by frictional contact, and in some instances, the parts have been connected together by positive fastenings. The latter form of connection between the U-shaped bars and the bridges lacks resiliency and frequently gives rise to fracture of the glass sections at the joints, under stress of wind pressure from below with the other form of connection involving frictional contact, due to the elastic or resilient gripping action between the bridges and the U-shaped bars, the movements of the roof covering by wind pressure and change of temperature, frequently cause the clamping bridges to become loose, thereby allowing too great movement of the glass covering and a consequent fracture of the same.

The present invention is designed to overcome both of these difficulties, and to provide means for securing the glass covering in place, to admit of a limited and necessary movement between the covering and its supports, said means exercising an increased gripping action upon the U-shaped bars when the roof tends to rise under the influence of wind pressure from below, so that the connections between the covering and the supporting bars can never work loose.

To this end, the invention comprises a roof structure, involving a U-shaped supporting bar, preferably provided with edge flanges, a clamping bridge spanning the U-shaped bar, said bridge being formed of two symmetrically disposed plates pivoted together intermediate their ends, each of said plates having a pendent lug at one end gripping one flange of the U-shaped bar, and a pendent and hooked or inturned lug at the other end embracing the opposite flange of said bar, a bolt loosely mounted on the pivot connecting the bridge plates, upon which is mounted the usual longitudinal rails or bars and packing strips, between which the edges of the glass covering are secured.

Figure 2:
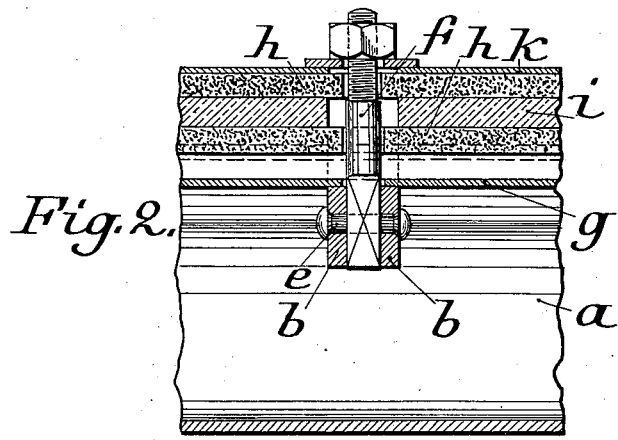
Figure 3:
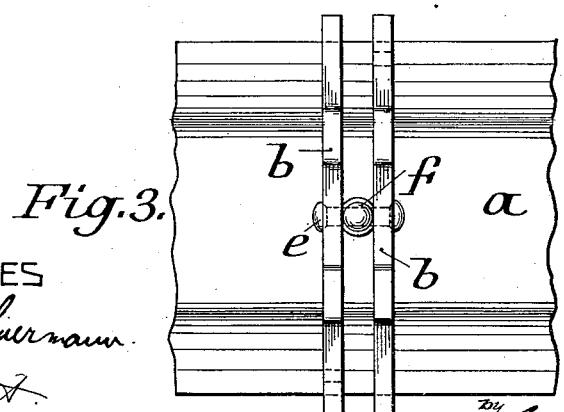

The invention is illustrated in the accompanying drawings, in which,

Figure 1 is a transverse section through a roof at one of the U-bars. Fig. 2 is a longitudinal section thereof. Fig. 3 is a top plan view from which the clamping rails and the glass covering are omitted.

Referring to the drawings, $a$ indicates the U-shaped carrier bar, preferably provided with outwardly projecting edge flanges, upon which is mounted a clamping bridge comprising two symmetrically disposed plates $b$, $b$, adapted to span the bar $a$, each of said plates having at one end a pendent lug $d$, adapted to grip the corresponding flange on the bar $a$, and at the other end, a pendent, hook-shaped or inturned lug $c$, the lower portion of which passes under the corresponding edge flange of the bar $a$, the lugs $d$, $d$ and $c$, $c$ on the respective plates being located diametrically opposite each other. The plates $b$, $b$ are pivoted to each other in scissor fashion by an intermediate stud $e$, extending longitudinally of the bar $a$, and pivoted to said stud $e$ is a bolt $f$, which serves to connect the clamping bridge to the roof covering and its auxiliary connections.

The upper edges of the plates $b$ are recessed to receive a bottom rail $g$, which supports the usual felt or other resilient packing strip $h$, which in turn receives the edges of the panes or sheets $i$. The bolt $f$ passes through the bottom rail $g$ and the packing strip $h$, and likewise passes through an upper packing strip $h$ and a top rail $k$, the several parts thus assembled being secured firmly in place by setting up the nut on the bolt $f$.

To apply the bridge piece in proper position on the bars $a$, the side walls of the U-shaped bar $a$ are compressed, by means of an appropriate tool, to admit of the inturned ends of lugs c, c on the respective plates b being dropped over and under the edge flanges of the bar a, and the corresponding pendent lugs d being dropped over the coöperating edge flanges of said bar. Upon releasing the bar a, the side walls spring out and engage the lugs of the bridge plates b, so that the pendent lugs d merely grip the edge flanges, while the pendent and inturned lugs c substantially embrace the corresponding edge flanges. The other elements of the roof structure are then assembled and secured by the bolt f in the usual manner.

If the roof cover, as thus secured, tends to rise, as the result of wind pressure from below or from any other cause, tending to separate the glass from the supporting bar a, the pivot e is correspondingly raised with the roof cover by the bolt f and the upward movement of the pivot causes the two plates b, b to move scissor-wise relative to each other, and thereby effect a shortening of the intermediate space or distance between the diagonally opposite lugs on the respective plates b, b, causing the lugs c and d to grip the edge flanges of the bar a with a pressure increasing directly with the extent of upward movement of the roof covering and the pivot e. It will thus be evident that the greater the tendency of the roof covering to rise, the greater is the gripping or binding action between the bridge plates b, b and the supporting bar a, and because of the disposition of the oppositely disposed lugs c, c of the respective plates b, b, under the edge flanges of the bar a, the clamping bridge can under no circumstances work loose or be separated from said bar, which has been a common objection to former constructions, in which the upward movement of the roof covering caused the bridge pieces to work loose and even become separated from their supporting bars. Under the scissor-like action of the plates b, b of the clamping bridge, the lugs d, d, grip the opposite edges of the flanges of bar a, while the lugs c, c on the corresponding plates not only grip the flange edges, but engage the same from below and prevent any excessive movement between the bridge and the bar a and therefore between the glass roof covering and said bar.

What I claim is:—

1. In a roof structure of the class described, the combination of a main supporting bar, a clamping bridge spanning said bar comprising two plates having end portions adapted to grip the edges of the said bar, a pivot pin connecting said plates intermediate their ends and extending longitudinally of said bar and means for locking the roof covering to said bridge through the pivot thereof.

2. In a roof structure of the class described, the combination of a flanged U-shaped supporting bar, a clamping bridge comprising two oppositely disposed plates, each having a pendent lug at one end and a hooked lug at the other end to engage the flanges of the supporting bar, a pivot pin connecting said plates intermediate their ends and extending longitudinally of the bar, and means connected to said pivot pin for locking the roof covering to said bridge.

3. In a roof structure of the class described, the combination of a U-shaped supporting bar having outwardly projecting edge flanges, a clamping bridge spanning said bar comprising two symmetrically disposed plates each having a pendent lug at one end and an inturned lug at the other end to engage the edge flanges, a pivot pin connecting said plates intermediate their ends and extending longitudinally of the bar, and a bolt swiveled to said pivot pin for locking the roof covering to said clamping bridge.

In testimony whereof I affixed my signature, in presence of two witnesses.

ADOLPH WENDLER.

Witnesses:
HENRY HASPER,
WOLDEMAR HAUPT.

---

Copies of this patent may be obtained for five cents each, by addressing the "Commissioner of Patents, Washington, D. C."